United States Patent Office.

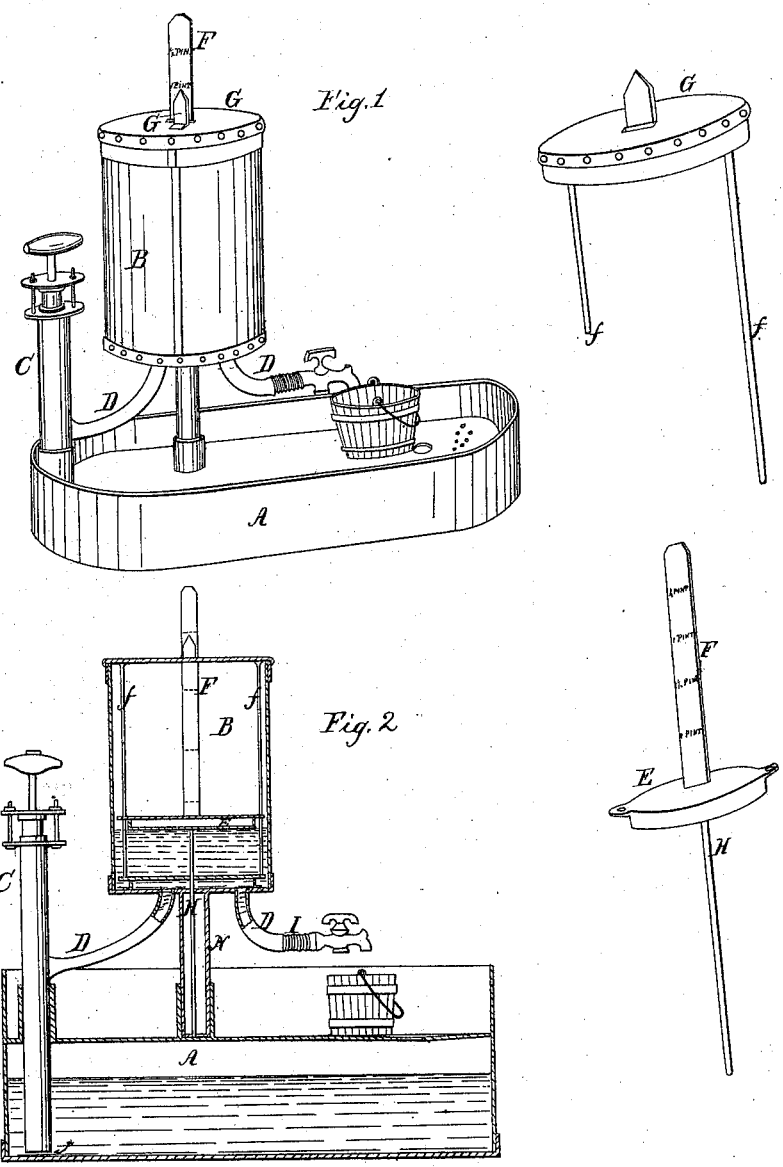

JOSEPH S. GOLD, OF SPRINGFIELD, ILLINOIS.

Letters Patent No. 90,044, dated May 11, 1869.

IMPROVEMENT IN MEASURING-CAN FOR LIQUIDS.

The Schedule referred to in these Letters Patent and making part of the same

Be it known that I, JOSEPH S. GOLD, of Springfield, Sangamon county, State of Illinois, have invented a new and improved Machine for Drawing Off and Measuring Coal-Oil and Spirits, and other Liquids; and I do hereby declare that the following is a full, clear, and accurate description of the construction and operation of the same, reference being had to the accompanying drawings, and to the letters of reference marked thereon.

Figure 1 represents the machine attached to a coal-oil can.

Figure 2 represents a sectional view, showing the inside of the machine.

A is a coal-oil can, with a flange elevated about a foot above the top of the can.

B is the reservoir of the meter.

C is a common cylindrical pump, connected with the reservoir underneath by the pipe D, through which the liquid is forced, by the pump, into the reservoir. This pipe D has a check-valve at its opening in the reservoir. This reservoir also has a false bottom.

E is a float, constructed so as to be buoyed up by the liquid underneath, and to slide freely, in slots, up and down on the wire guards $ff$, extending from the cover of the reservoir, to which they are attached, down the sides, to the bottom.

F is a graduated measure, attached to the top of the float E, and consisting of a straight piece of metal, running perpendicular from the float E, and perforating the centre of the cover of the reservoir, and sliding freely up and down through the cover.

G is an indicator, consisting of a cone-shaped piece of metal, attached to the cover of the reservoir, and extending up the side of the dial, the object of which is to point out upon the dial the quantity, either in pints, quarts, or gallons, of liquid in the reservoir.

H is a piece of wire or stiff metal, running from the bottom of the float E, and extending down into the tube N, at the bottom of the reservoir, for the purpose of keeping the float steady.

I is the pipe, with faucet, used to draw off the liquid from the reservoir.

The operation of this machine, when attached to a coal-oil can with flanged sides of this description, is to enable parties to draw off the oil from the can, and measure the same without spilling it, or without soiling with the oil the person drawing it. This is accomplished by setting the vessel to hold the oil under the faucet I, and drawing it off after it is pumped into the reservoir, and there measured, the drippings running back again into the can, the person not having been obliged to touch the oil or the can.

The operation of the machine as a measurer of liquids is as follows:

It is attached to any vessel containing liquids in the manner that it is attached to the can in the drawing. The pump C forces the liquid, through the pipe D, into the reservoir B, and, as the reservoir fills up, the float E rises with the liquid, and with it the graduated measure F, which is marked, to indicate the quantity in the reservoir.

Now, what I claim as my invention, and desire to secure by Letters Patent, is—

The flanged receptacle A, provided with perforations in its top, in combination with the pump C, reservoir B, tubes D D and N, float E, guide-rods $ff$ and H, and graduated measure F, all constructed, arranged, and operated in the manner and for the purpose set forth.

J. S. GOLD.

Witnesses:
JAMES L. HILL,
ED. A. WILSON.